May 6, 1947.  R. H. HILL  2,420,136
SIX CYCLE ENGINE
Filed Oct. 11, 1944  3 Sheets-Sheet 1

Inventor
Ralph H. Hill,
By McMorrow & Berman
Attorneys

May 6, 1947.　　　　R. H. HILL　　　　2,420,136
SIX CYCLE ENGINE
Filed Oct. 11, 1944　　　　3 Sheets-Sheet 3

Inventor
Ralph H. Hill,
By
Attorneys

Patented May 6, 1947

2,420,136

UNITED STATES PATENT OFFICE 2,420,136

SIX CYCLE ENGINE

Ralph H. Hill, Flint, Mich.

Application October 11, 1944, Serial No. 558,171

3 Claims. (Cl. 123—64)

This invention appertains to cooling systems for internal combustion engines, both reciprocating and rotary or turbine, and has for its principal object to provide a highly effective method and means for maintaining an engine at an efficient operating temperature; said method being partly adiabatic and partly thermal convection in character and, in its performance, results in the recovery of energy, resident in the heat ordinarily lost in cooling, for its utilization to supplement the normal explosive fuel supply of the engine.

Another object of the invention has to do with the provision of the aforesaid method and means, in which alternating cycles of explosive charges, i. e., mixed air and gas, and of volumes of air only, are introduced to the engine by either a mechanically or a thermostatically controlled valve system; the mechanically control valve system operating to alternate the cycles at regular intervals and the thermostatically controlled valve system to alternate the cycles according to the temperature of the air.

With these and other objects in view, the invention resides in the certain new and useful combination, construction, and arrangement of parts, as will be hereinafter more fully described, set forth in the appended claims, and illustrated in the accompanying drawings, in which:

Figure 1:
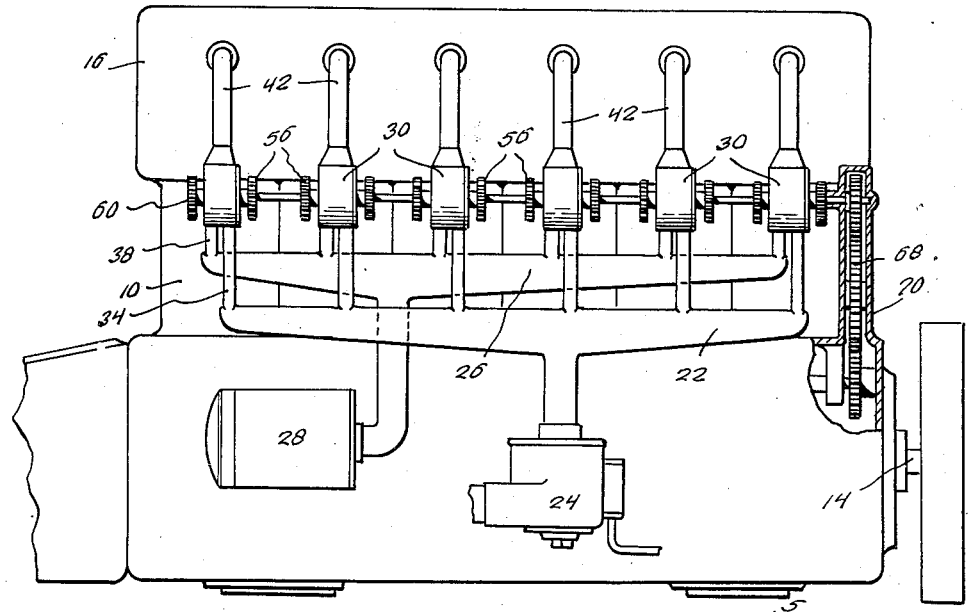
Figure 1 is a side elevation of an internal combustion engine, in accordance with the invention.
Figure 3:
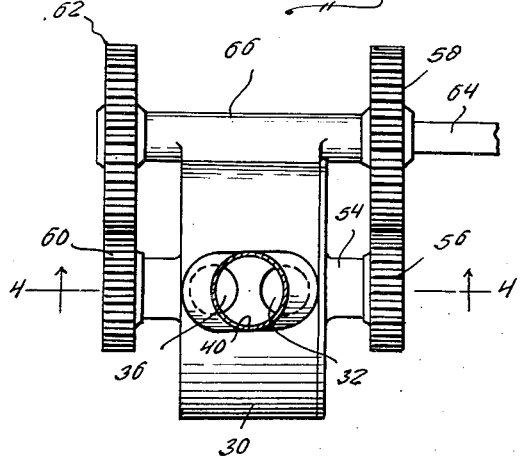
Figure 3 is an enlarged top plan view, partly in section, of one of the mechanically operated valve units for controlling the alternate admission of explosive mixture and undiluted air charges to one cylinder of the engine.
Figure 4:
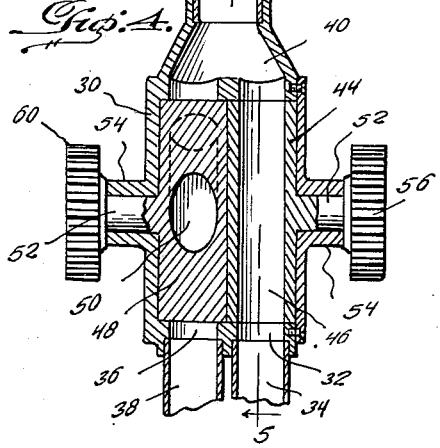
Figure 4 is an enlarged sectional detail, taken through the line 4—4 on Figure 3, looking in the direction of the arrows.
Figure 2:
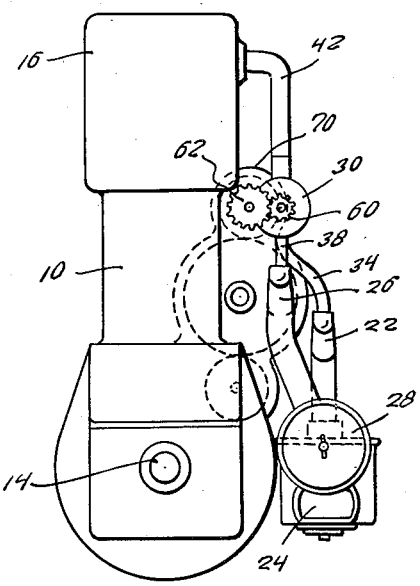
Figure 2 is an end elevation.
Figure 5:
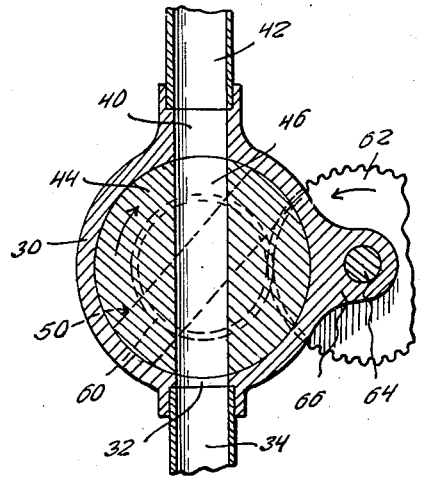
Figure 5 is a sectional view similar to that of Figure 4, but taken through the line 5—5 on Figure 4, looking in the direction of the arrows.
Figure 6:
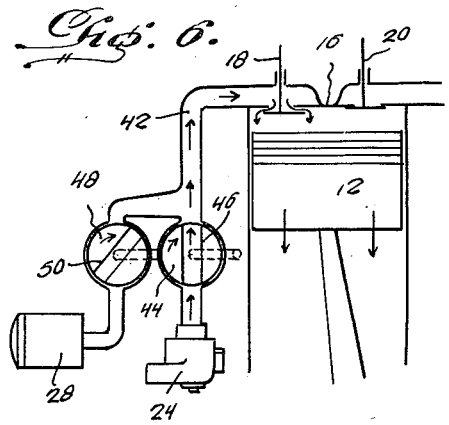
Figure 6 is a diagrammatical view through a cylinder of the engine and an associated valve unit, showing the relative positions of the explosive mixture and undiluted air charge control valves, with the explosive mixture valve open to establish communication between the carburetor and the intake port of the engine cylinder, the intake valve of the latter being also open.
Figure 7:
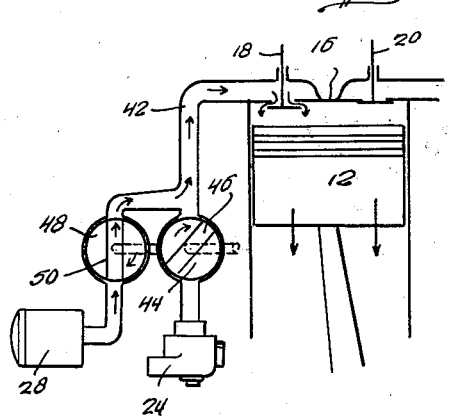
Figure 7 is a view similar to that of Figure 6, but showing the alternate positions of the explosive mixture and undiluted air charge control valves, the explosive mixture control valve being closed and the undiluted air control valve, together with the intake valve of the engine cylinder, open to establish communication between a filter type air intake and the intake port of the engine cylinder.

In accordance with the invention, the method of cooling an internal combustion engine, whether of the reciprocating or the rotary (turbine) type, consists in the passing of a volume of air, preferably filtered, from atmosphere through the cylinders of the engine, or its body, as the case may be, following a predetermined, or an indeterminate, number of firing cycles, which would otherwise tend to cause over-heating, resulting in serious loss in operating efficiency, as well as in abnormal lubricant consumption. To control the cyclic admission of explosive mixture and undiluted air charges, in a predetermined ratio, a mechanically operated valve mechanism is provided and is geared, or otherwise operatively connected, to the engine shaft, or, to control such admission only during indeterminate periods of above normal efficient operating temperatures, i. e., over-heating, the valve mechanism is thermostatically actuated.

In order to demonstrate the invention, the drawings are now referred to in detail, like characters of reference being employed to denote corresponding parts in the several views thereof, and, in Figures 1 through 7, one form of the valve mechanism, as is exemplified therein, is depicted as it appears when applied to a standard type of internal combustion engine, which, for purposes of the present description, has six cylinders 10, arranged in line, each containing a vertically reciprocating piston 12, operatively connected with the crank shaft 14. The top open ends of the cylinders 10 are closed by a common head 16 which is provided with an intake port and an exhaust port and their respective valves 18 and 20 for each cylinder, as customary; said valves being actuated in proper sequence by the usual mechanism that is, in turn, operated from the crank shaft 14. An intake manifold 22 is mounted on one side of the engine to distribute an explosive mixture, gas and air, from a standard type of carbureter 24. An exhaust manifold (not shown) is of course provided to receive the burnt gases evacuated from the cylinders 10 outwardly through the exhaust ports, upon the opening of the valves 20, which occurs during closed periods of the intake valves 18.

For the purpose of supplying a volume of undiluted air to the several cylinders 10, at intervals between periods of normal engine operation, a second intake manifold 26 is mounted on the side of the engine, preferably in juxtaposition to the regular intake manifold 22, and is open to atmosphere through a filter 28. Interposed between the intake manifolds 22 and 26 and each of the valved intake ports 18 in the cylinder head 12, is a cylindrical casing 30, which has its peripheral wall provided with a pair of juxtapositioned inlet ports 32 and 36 and a single outlet port 40, the latter opening through that wall at a point diametrically opposite the said inlet ports. A pipe connection 34 connects the inlet port 32 with the explosive mixture intake manifold 22 and a like connection 38 connects the inlet port 36 with the filtered air intake manifold 26, while a pipe connection 42 connects the outlet port 40 with the valved intake port 18. Housed within the casing 30 is a pair of rotary valve elements 44 and 48, which are respectively provided with diametrically extending ducts 46 and 50 to establish communication between the inlet ports 32 and 36 and the outlet port 40, when the valve elements are rotated to that end.

The valve elements 44 and 48 are each provided with a stub-shaft 52, projecting outwardly from the same through a bearing element 54, opening through a side wall of the casing 30, the outer end of the shaft of the valve element 44 mounting a pinion 56 and the like end of the shaft of the valve element 48, a pinion 60. These pinions 56 and 60 mesh respectively with gears 58 and 62, which are splined on a shaft 64, that is supported in aligned bearings 66, provided at the rear sides of the several cylindrical valve casings 30. One end of the shaft 64 is operatively connected with the crank shaft 14 of the engine, e. g., by means of a gear train or the like 68, which is preferably enclosed within a housing 70.

In the operation of the valve mechanism as thus constituted, cycles of undiluted and filtered air will be alternated with firing cycles of an explosive mixture, gas and air, throughout the operation of the engine, the heat generated within the cylinders 10 during the firing cycles being transferred to the air in its passage therethrough, so that a substantially uniform temperature will be maintained within the cylinders and the engine will operate at maximum power producing and lubrication efficiency. It is preferred, however, that the engine be operated with but one air cycle alternated with a predetermined number of firing cycles and, to such end, the pairs of intermeshing pinions and gears 56, 58, and 60, 62, will differ in ratio, say five to one, respectively, so that there will be five revolutions of the rotary valve 44, controlling the admission of the explosive mixture to the cylinders 10, for each revolution of the rotary valve 48, controlling the admission of the filtered air thereto, or, in other words, there will be one air admission cycle alternating with each five firing cycles of operation of the engine. Thus, the absorption of heat by the air drawn into a cylinder 10, on the intake or suction stroke of the piston 12 and the subsequent compression of the heated air on the compression stroke of the piston makes for economy in fuel consumption without any material reduction in the operating efficiency of the engine.

Figure 8:
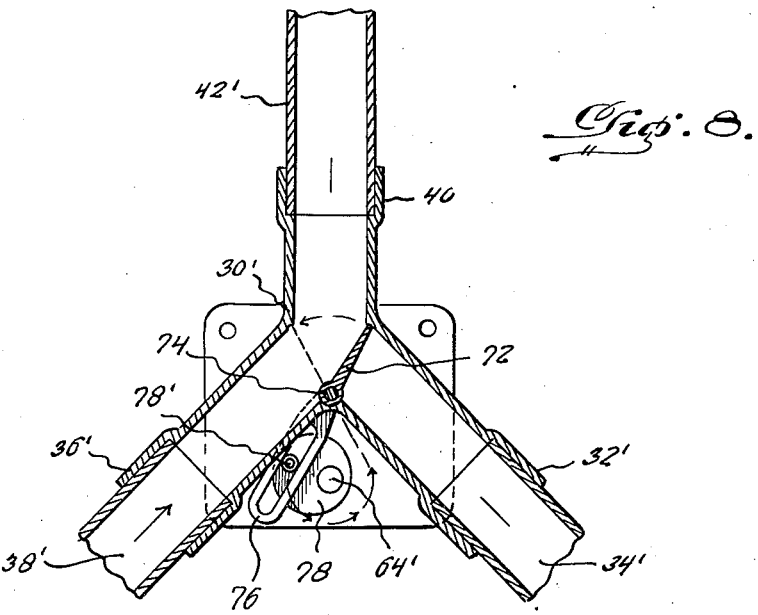
Figure 8 is a sectional detail of a modified valve unit, wherein a single flap type of valve is oscillated between its alternate positions of operation through the medium of a link and eccentric driven means.

Referring now to the modification of the valve mechanism, as it is exemplified in Figure 8, the cylindrical form of valve casing 30 is here replaced by an inverted Y-shaped casing 30', which has its upper outlet end 40' connected by a pipe 42' to a valved intake port 18, in the cylinder head 16, and its lower angled inlet ends 32' and 36', respectively connected by pipes 34' and 38' to the explosive mixture intake manifold 22 and the filtered air intake manifold 26. A single flap valve 72 is pivoted, as at 74, at the vertex of the angle formed by the lower inlet portions 32', 36', of the casing 30', and is to be oscillated on the pivot to alternately open and close the upper ends of the inlet portions. Thus, in one position of the flap valve 72, communication will be established between the explosive mixture intake manifold 22 and the cylinder 10, by way of the inlet and outlet ends 32' and 40', of the casing 30', and, in the other position thereof, a volume of filtered air will be drawn into the cylinder from the air intake manifold 26, by way of the inlet and outlet ends 36' and 40'. In the case of a multi-cylindered engine, such as that shown, one of either of these two forms of alternator valve units will be provided for each of the cylinders, with a common actuating means operatively connected with the power shaft of the engine; the respective valve elements being arranged to operate in properly timed sequence to accord with the firing order of the cylinders.

To effect the operative motions of each of the flap valve 72, a slotted actuator arm or yoke 76 is affixed to a pivot 74, exteriorly of the casing 30', in proper relation to the flap valve, and has the slot thereof engaged over a circular disk 78, which is eccentrically mounted on a driven shaft 64', that is operatively connected with the engine shaft 14, somewhat after the manner of the shaft 64 (Figures 1 and 2), i. e., by means of the gear train 68. Abutments 80 are provided on the opposed (inner) sides of the inlet portions 32', 36', of the casing 30', to prevent any overthrow of the arm or yoke 76 and consequent damage to the flap valve, in the event of undue wear on the coacting surfaces of the arm or yoke and the eccentric element 78.

Figure 9:
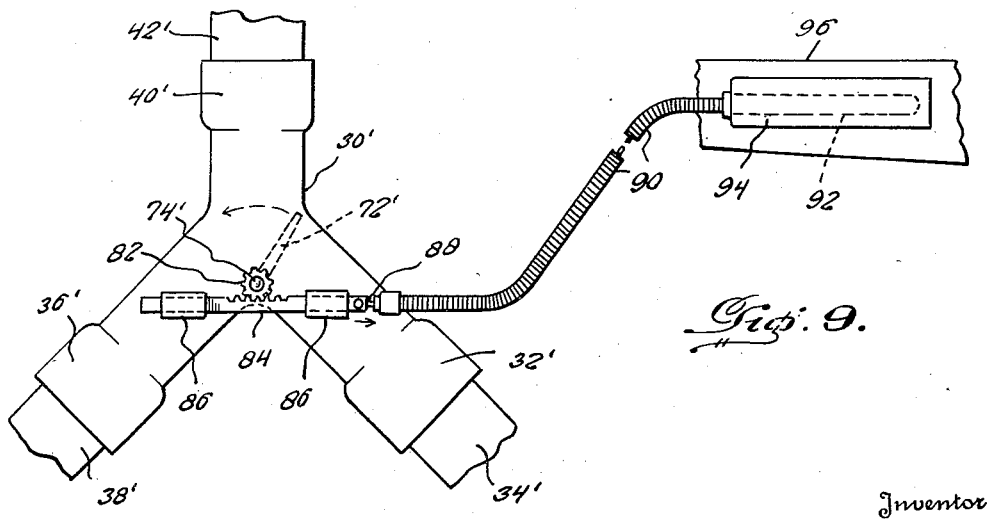
Figure 9 is a fragmentary detail, in side elevation, of the modified valve unit shown in Figure 8, but showing a thermostatic means for actuating the flap type of valve.

In the modified form of valve unit, as exemplified in Figure 9, the operation of its valve element 72' is effected thermostatically, when the temperature of the heat generated within the engine exceeds that required for maximum efficiency in the operation of the latter and, to such end, a pinion 82 is splined on the pivot 74', of the valve element 72', and is meshed with the teeth of a rack bar 84, which is slidably mounted in lugs 86, formed on one side of the inlet portions 32', 36', of the casing 30'. One end of the rack bar 84 is coupled, as at 88, to one end of a flexible element or cable 90 which, in turn, has its other end connected to the expansion element 92, of a thermostat 94. In use, the thermostat 94 will preferably be enclosed within the exhaust manifold 96 of the engine, where it will be sensitive to variations in the temperature of both the hot gases or heated air, immediately following the evacuation of the same from the cylinders 10.

From the foregoing, it will be obvious that the cooling system thus provided may be employed alone, or in conjunction with the usual water circulation system of cooling, but its effectiveness will be greatest in the absence of the latter method of cooling, particularly from the viewpoint of economy in fuel consumption and power augmentation, inasmuch as a lower cyclic ratio between explosive mixture and filtered air admissions will be necessary to that end. Also, it will be apparent that the laws of thermodynamics are applicable to support the adiabatic process having to do with the imparting of heat to the cold air admitted to the engine cylinders and the subsequent raising of the temperature of the heated air during the compression strokes of the pistons, while the thermal convection process acts to aid the suction strokes of the pistons in the indrawing and circulation of the cold air to and through the cylinders.

Having thus fully described my invention, it is to be understood that any and all changes in the alternator valve design and construction, and in that of the actuating mechanisms therefor, may be resorted to without departing from the spirit and scope of the invention as claimed.

I claim:

1. In a multi-cycle internal combustion engine, the combination with a plurality of firing chambers, each chamber being provided with an intake port, a fuel mixture intake, and an undiluted air intake, of a valve means for each of said chambers in association with said fuel intake and said air intake and connected to said chambers, said valve means including a casing provided with a pair of inlet ports contiguously arranged with respect to each other and having an outlet port suitably spaced from said pair of inlet ports, a valve element intermediate said pair of inlet ports and said outlet port and operable so as to cause said inlet ports to be alternately brought into communication with said outlet port, means for connecting one of the pair of said inlet ports to said fuel intake, means for connecting the other of said pair of inlet ports to said air intake, means for connecting said outlet port to the intake port of the firing chamber complemental thereto, and actuating mechanism in operative association with the valve element of each of said valve means for causing alternate movement of each of the latter to thereby shift each of the pair of inlet ports into and out of communication with the outlet port complemental thereto.

2. In a multi-cycle internal combustion engine, the combination with a plurality of firing chambers, each chamber being provided with an intake port, a fuel mixture intake, and an undiluted air intake, of a valve means for each of said chambers in association with said fuel intake and said air intake and connected to said chambers, said valve means including a casing provided with a pair of inlet ports contiguously arranged with respect to each other and having an outlet port suitably spaced from said inlet ports, a valve element intermediate said pair of inlet ports and said outlet port and mounted for swinging movement so as to cause said inlet ports to be alternately brought into communication with said outlet port, means for connecting one of the pair of said inlet ports to said fuel intake, means for connecting the other of said pair of inlet ports to said air intake, means for connecting said outlet port to the intake port of the firing chamber complemental thereto, and actuating mechanism in operative association with the valve element of each of said valve means for causing alternate movement of each of the latter to thereby shift each of the pair of inlet ports into and out of communication with the outlet port complemental thereto.

3. In a multi-cycle internal combustion engine, the combination with a plurality of firing chambers, each chamber being provided with an intake port, a fuel mixture intake, and an undiluted air intake, of a valve means for each of said chambers in association with said fuel intake and said air intake and connected with said chambers, said valve means including a casing provided with a pair of inlet ports contiguously arranged with respect to each other and having an outlet port suitably spaced from said inlet ports, a rotatably mounted valve element in each of said inlet ports, means on each of said valve elements for imparting rotative movement thereto, means for connecting one of the pair of said inlet ports to said fuel intake, means for connecting the other of said pair of inlet ports to said air intake, means for connecting said outlet port to the intake port of the firing chamber complemental thereto, and actuating mechanism operatively connected to the rotative movement imparting means of each of the rotatably mounted valve elements of all of said valve means for causing rotative movement of each of the respective pairs of rotatably mounted valve elements to thereby shift each of the pair of inlet ports into and out of communication with the outlet port complemental thereto.

RALPH H. HILL.

REFERENCES CITED

The following references are of record in the file of this patent:

UNITED STATES PATENTS

| Number | Name | Date |
|--------|------|------|
| 334,153 | Babcock | Jan. 12, 1886 |
| 334,155 | Babcock | Jan. 12, 1886 |
| 1,825,959 | Kondo | Oct. 6, 1931 |
| 654,356 | Rambaud | July 24, 1900 |
| 871,632 | Rollinson | Nov. 19, 1907 |
| 2,067,171 | Beard | Jan. 12, 1837 |
| 2,355,806 | Kroyer | Aug. 15, 1944 |
| 1,315,954 | Frazier | Sept. 16, 1919 |
| 1,695,704 | Archer | Dec. 18, 1928 |